United States Patent [19]

Ostrowski et al.

[11] Patent Number: 4,900,619
[45] Date of Patent: Feb. 13, 1990

[54] TRANSLUCENT HOUSEWRAP

[75] Inventors: Henry S. Ostrowski; Roy D. Goodwin, both of Greenville; William C. Jackson, Travelers Rest; Jay D. Gillespie, Greenville, all of S.C.

[73] Assignee: James River Corporation, Richmond, Va.

[21] Appl. No.: 371,156

[22] Filed: Oct. 17, 1988

[51] Int. Cl.$^4$ .............................................. B32B 27/00
[52] U.S. Cl. ...................... 428/284; 156/628; 156/296; 156/302.2; 428/219; 428/286; 428/292; 428/293; 428/294; 428/903
[58] Field of Search ................ 156/62.8, 296, 308.2; 428/292, 293, 294, 284, 286, 219

[56] References Cited

U.S. PATENT DOCUMENTS

| | | | |
|---|---|---|---|
| 3,081,519 | 3/1963 | Blades et al. | 28/81 |
| 3,169,899 | 2/1965 | Steuber | 161/72 |
| 3,442,740 | 5/1969 | David | 156/181 |
| 3,676,242 | 7/1972 | Prentice | 156/624 |
| 4,041,203 | 8/1977 | Brock et al. | 428/157 |
| 4,086,381 | 4/1978 | Cheshire et al. | 428/113 |
| 4,302,495 | 11/1981 | Marra | 428/110 |
| 4,374,888 | 2/1983 | Bornslaeger | 428/198 |
| 4,436,780 | 3/1984 | Hotchkiss et al. | 428/198 |

OTHER PUBLICATIONS

Tyver ® Energy-saving air infiltration barrier, DuPont Company, Centre Road, Wilmington, DE 19898

Primary Examiner—James J. Bell
Attorney, Agent, or Firm—Richard J. Gallagher

[57] ABSTRACT

A translucent nonwoven fabric composite, suitable for use as a housewrap, is disclosed. The composite comprises a meltblown fabric layer laminated to a reinforcing fabric layer and may include tacking strips. The composite may be prepared by calendering a meltblown fabric and a reinforcing fabric together in a nip equipped with a resilient roll.

13 Claims, 1 Drawing Sheet

TRANSLUCENT HOUSEWRAP

This is a continuation of copending application Ser. No. 56,822, which was filed on June 2, 1987, now abandoned.

FIELD OF THE INVENTION

The present invention relates to large scale fabric sheeting that is useful in the construction of buildings. Such sheeting, which comprises bonded fibers rather than films, permits the passage of water vapor while inhibiting the passage of air. It is normally placed on the exterior wall of the building, either over the studs and under the sheathing or over the sheathing and under the siding, shingles, or other facing. So used, it may be referred to as "housewrap". Housewrap of this type enhances a building's insulation properties without causing moisture condensation inside the wall structure.

DESCRIPTION OF THE RELATED ART

The DuPont Company has published a brochure promoting its TYVEK brand housewrap. TYVEK housewrap is described as being "a sheet of very fine, high-density polyethylene fibers". The brochure provides no further details on the construction of the polyethylene sheet. However, it is believed that the sheet is produced by hot calendering a web made by a flash-spun process where polyolefin polymer is converted into three-dimensional networks of thin continuous interconnected ribbons called film-fibers or plexifilaments. This process is believed to be disclosed in U.S. Pat. Nos. 3,081,519, 3,442,740, and 3,169,899.

U.S. Pat. No. 4,374,888 to Bornslaeger discloses a polypropylene composite that comprises a layer of meltblown polypropylene sandwiched between two layers of spunbonded polypropylene, one of which is resistant to ultraviolet light radiation and the other which has flame retardant properties. The laminate is pattern-bonded, and is taught to be useful for recreational fabric applications.

U.S. Pat. No. 4,041,203 to Brock et al. discloses meltblown/spunbonded polypropylene composites useful in applications such as garments, wipes, and the like, and as wrappers on containment fabrics for surgical or other health care procedures. Brock et al teach that the material possesses an overall opaque textile-like appearance. U.S. Pat. Nos. 3,676,242, 4,086,381, 4,302,495, and 4,436,780 disclose other polypropylene fabrics.

SUMMARY OF THE INVENTION

The basic fabric of this invention comprises a laminate of a first web, the meltblown web, composed primarily of generally discontinuous thermoplastic polymeric microfibers, and a second web, the textile fiber web, composed primarily of randomly deposited molecularly oriented filaments of common textile denier spun from a thermoplastic polymer, with the two webs being of compatible polymer chemistry such that the two can be calendered together using heat and pressure to yield a strong controlled porosity fabric useful as a housewrap.

This housewrap fabric can be improved if an additional web of textile fibers is positioned parallel to the edges of the basic laminated composition of this invention. A particularly efficient way to practice this improvement is to use this additional web in the form of several strips running parallel to the edges of the basic laminated composition. These strips could, for example, run along the two edges and down the middle of the housewrap fabric. These strips act as reinforcing members to prevent tearing and as fastening sites for nailing, tacking, stapling, or otherwise affixing the housewrap fabric to the house.

Unexpectedly, the lamination process to form the basic housewrap fabric of this invention (textile fiber web plus meltblown web) is successful only if the first and second webs are calendered together in a nip equipped with at least one resilient roll.

DESCRIPTION OF THE PREFERRED EMBODIMENTS

Figure 1:
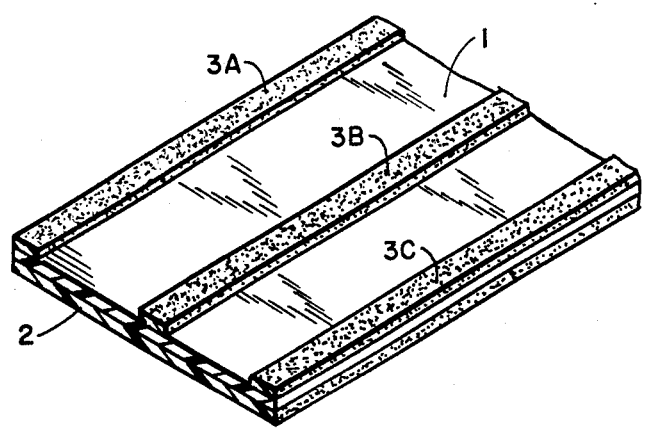
FIG. 1 shows a top-and-side perspective view of the various layers and strips in an illustrative polypropylene housewrap fabric composite according to the present invention.

The basic housewrap fabric of this invention comprises a laminate of two different webs of compatible polymer chemistry that can be calendered together using heat and pressure. One of said webs provides barrier characteristics to the laminate; the other web provides structural integrity thereto.

The support web, that is the textile fiber web, must be composed primarily of randomly deposited molecularly oriented filaments of common textile denier spun from a thermoplastic polymer. Those skilled in the art will recognize the two essential requirements for such a web, first the use primarily of thermoplastic synthetic fiber and, second, the random lay down of that fiber into a web. The preparation of thermoplastic synthetic fibers by the process of melt spinning and drawing to form molecularly oriented filaments is well known. Proper control of the process results in a range of fiber deniers commonly used in the textile industry. For this invention, fiber denier in the range of about 1 g to about 10 g per 9,000 meters of filament length is particularly desirable.

A variety of thermoplastic polymers can be spun into filaments useful for this invention. Examples include: poly(caprolactam), commonly called Nylon 6; poly(hexamethylene adipamide), commonly called Nylon 6,6; poly(ethylene terephthalate) and/or poly (ethylene isophthalate) and copolymers thereof, commonly called polyesters; polypropylene; and polyethylene. Spunbonded polypropylene filament webs produced under the brand name CELESTRA ® by James River Corporation have been found to be particularly useful for practising this invention.

Those skilled in the art will recognize several approaches to the random lay down of thermoplastic filaments. Two methods are cited as examples. Thermoplastic filaments can be cut into short lengths to form staple fiber. A web useful in practicing this invention will result if staple fiber is first put through the steps of the carding process and then subjected to thermobonding by exposure to a hot patterned roll under pressure in a calender.

Alternatively, a web useful for this invention will result from the spunbonding process. In this process, a thermoplastic polymer is extruded through a spinneret to form continuous filaments, the filaments are drawn to achieve molecular orientation, the continuous filaments are deposited in a substantially random manner onto a moving wire, and the filaments of the resulting web are bonded together, for example by exposure to a hot patterned roll under pressure in a calender. The manner of preparing spunbonded webs is disclosed in a number of patents, including U.S. Pat. Nos. 3,338,992, 3,341,394, 3,276,944, 3,502,763, 3,509,009, 3,542,615, and 3,693,618.

The barrier web, that is the meltblown web, needed for the laminate comprising this invention is composed primarily of generally discontinuous thermoplastic polymeric microfibers. This type of web can be made by the process known in the art as the meltblown process. This process has been described in U.S. Pat. Nos. 3,715,251, 3,704,198, 3,676,242, and 3,595,245. In the meltblown process, molten polymeric material is extruded into fine streams and these streams are then broken into discontinuous fibers of small diameter by exposure to high velocity heated air. The microfibers contained in the web will have an average fiber diameter of generally less than about 20 microns.

A variety of thermoplastic polymers can be used to make meltblown webs, including, for example: polycaprolactam, Nylon 6; poly(hexamethylene adipamide), Nylon 6,6; poly(ethylene terephthalate) or poly(butylene terephthalate), polyester; polypropylene; and polyethylene. Webs made from meltblown polypropylene filaments, produced under the brand name POLY-WEB ® by James River Corporation, have been found to be particularly useful for practising this invention.

The fibers used to make the textile fiber web and the meltblown web must be of compatible chemistry, in order that they will bond to one another when calendered together as described herein. Fabric composites of the type contemplated herein can be made when said first thermoplastic polymer and said second thermoplastic polymer are selected from the pairs consisting of, respectively: Nylon 6 with Nylon 6; Nylon 6 with Nylon 6,6; poly(ethylene terephthalate) with poly(ethylene terephthalate) and/or poly(ethylene isophthalate) or copolymers thereof; poly(butylene terephthalate) with poly(ethylene terephthalate) and/or poly(ethylene isophthalate) or copolymers thereof; polypropylene with polypropylene; and polyethylene with polyethylene.

The fibers used to make the textile web and the meltblown web may be made colored or rendered resistant to thermo- and ultraviolet-initiated degradation. For example such UV stabilizers as hindered amines and phenolic phosphites could be incorporated into the polymer prior to extrusion to yield a spunbonded fabric layer with resistance to UV-initiated decomposition. Addition of ultraviolet light stabilizers is particularly useful if the housewrap is attached to the sheathing of the house and then there is some delay in covering with the exterior siding.

The basic housewrap fabric of this invention can be improved by positioning a second web of textile fibers parallel to the edges of the basic laminated composition of this invention. The second web can be employed as several strips running parallel to the edges of the basic laminated composition. For example, the strips might run along the two edges and down the middle of the housewrap fabric to provide reinforcement to tearing.

The areas of the housewrap that are reinforced by strips are particularly suitable for tacking or otherwise affixing the housewrap to the sheathing. The translucent nature of the polypropylene fabric composites of the present invention facilitates the location of support members such as wooden studs under the sheathing to which the housewrap has been applied.

This second web can be composed primarily of thermoplastic synthetic textile fibers as described above for the first web of the laminate. Webs made by the spunbonding process have proved particularly useful as reinforcing strips.

The number and width of spunbonded fabric strips going into the fabric composite can vary over wide ranges. A very rough guideline would be to use one 2-inch strip for every 20 inches of fabric. For instance, good results have been obtained with three 2-inch strips on 54-inch wide material and with five 2-inch strips on 108-inch-wide material. When spunbonded polypropylene fabric is used to make the strips, each of the strips will have a basis weight in the range of from about 0.75 through about 1.5 ounces per square yard. The meltblown polypropylene layer will have a basis weight in the range of from about 0.5 through about 2.0 ounces per square yard. The spunbonded polypropylene layer will have a basis weight in the range of from about 0.5 through about 1.25 ounces per square yard.

Referring to FIG. 1, a typical polypropylene housewrap fabric according to the invention may include three spunbonded reinforcing strips 3A, 3B, and 3C, a meltblown polypropylene layer 1, and a spunbonded polypropylene layer 2.

Figure 2:
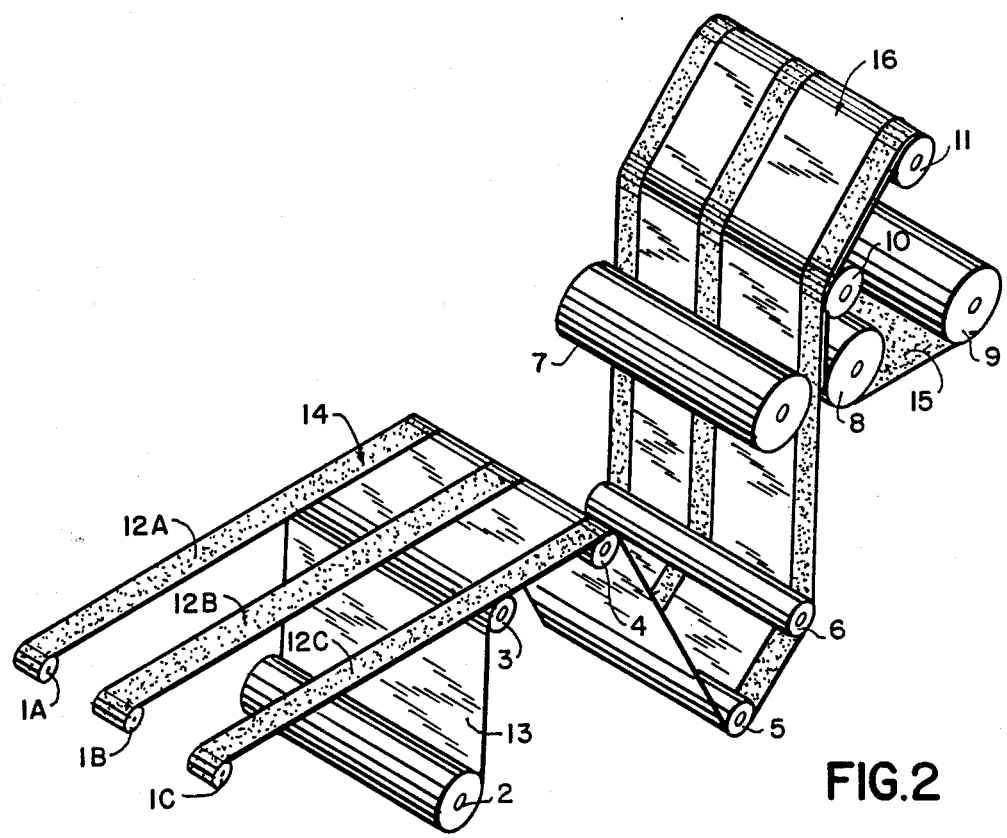
FIG. 2 is a schematic representation of a process for preparing the polypropylene housewrap fabric composites of the present invention.

The production of the fabric composites of the present invention may be accomplished on a calendering line, which may be set up as described herein with reference to FIG. 2. Roll 7 is a resilient roll, typically composed of hard rubber. Roll 8 is a nonresilient roll, typically composed of steel. Roll 2 is the meltblown polypropylene layer unwind roll. Rolls 1A, 1B, and 1C are spunbonded polypropylene strip unwind rolls. Roll 4 is a tension roll. Roll 9 is the spunbonded polypropylene layer unwind roll. Roll 11 is the fabric composite rewind roll. Rolls 3, 5, 6, and 10 are miscellaneous web control rolls.

In an example of producing the fabric composites of the invention, the meltblown fabric layer 13 is unwound to a tension roll 4. Simultaneously, three strips of spunbonded fabric 12A, 12B, and 12C are unwound to the same tension roll 4, in such a manner that one lies on top of each edge of the meltblown fabric being unwound and one lies on top of the middle of the meltblown fabric being unwound. The unbonded fabrics associated in this manner 14 are fed through a calendering nip between rolls 7 and 8. At the same time, the spunbonded fabric layer 15 is fed through the calendering nip in such a way that it contacts the side of the meltblown layer that is not contiguous to the spunbonded fabric strips. The calendering nip exerts a nip pressure to bond the three fabric feeds into the composite of the present invention. In this example, the calendering nip consists of a hard rubber roll at a temperature of approximately 290° F. and a steel roll at a temperature of approximately 280° F. The calendering nip exerts a nip pressure of about 720 pounds per linear inch. The production speed is in the neighborhood of 220 feet per minute.

Regarding the calendering conditions of temperature, pressure, and nip dwell time, an appropriate set of conditions must be selected so that the textile fiber web and/or the meltblown web start to soften and experience sufficient plastic flow so that these layers adhere together. At the same time, the microfilaments of the meltblown web must be compressed together to reduce meltblown porosity but with minimal conversion to an impervious film. Laminated fabrics of this invention can be made from polypropylene textile and meltblown webs when calender roll temperatures are chosen from the range of approximately 240° F. to 320° F. and calender roll pressure is greater than approximately 100 pounds per linear inch. The precise calendering conditions will depend on the textile fiber web and meltblown web used and the rate through the calender at which the webs are to be laminated.

Unexpectedly, the basic fabric of this invention, the laminate of a textile fiber web plus a meltblown web, is obtained only if the lamination process employs a calender nip equipped with at least one externally heated resilient roll. For example, the housewrap fabric will result if the textile fiber web and the meltblown web are calendered in a nip made by a smooth steel roll and a hard rubber roll. Such a smooth steel roll has a channel or a series of channels within it for the circulation of externally heated oil to maintain the roll surface at a temperature in the range of about 240° F. to approximately 320° F. This smooth steel roll allows essentially no surface deflection and is thus not a resilient roll. The hard rubber roll in the above example is a roll constructed similarly to the smooth steel roll with a means to circulate a fluid within itself. However, the surface of the roll is covered with a flexible material such as natural or synthetic rubber which allows variable surface deflection depending on choice of elastomeric formulation and its thickness. The surface of such a roll is best heated with an external source such as infrared lights that provide surface temperature in the range of about 240° F. to approximately 320° F. Temperature within the roll is maintained by circulation of fluid through the roll such that the heat loss from the surface into the roll is minimized while the joint between the rubber cover and the steel surface is maintained cool enough to prevent joint failure. The rolls that form the calender nip are held in a frame such that hydraulic forces can move the rolls against each other to achieve a desired pressure of greater than aproximately 100 pounds per linear inch.

The flexible material used to cover the resilient roll can be made from a variety of materials, including chlorosulfonated polyethylene, sold as HYPALON roll covering by Stowe Woodward Co., butadiene acrylonitrile copolymer, sold as DYNAROCK roll covering by Stowe Woodward Co., and modified natural rubbers such as IVORYITE roll covering sold by Stowe Woodward Co. Alternatively, the resilient roll could be made from very densely packed cotton, wool or paper. A major requirement for the flexible material is that it is stable to the temperature and pressure needed to laminate the fabric of this invention.

Those skilled in the art will conceive of several approaches for attaching the reinforcing strips to the basic housewrap fabric including sewing, use of adhesives, and direct lamination. The latter two methods have proved to be particularly useful.

Direct lamination is dependent on chemical compatibility between the reinforcing strip and the meltblown component of the basic laminate of this invention. Thus, polypropylene spunbonded reinforcing strips have been attached by placing them against the meltblown web during calendering of the basic laminate of the polypropylene meltblown and textile fiber webs.

Hot melt adhesives have been used to bond the reinforcing strips to the basic housewrap fabric. In this approach, adhesive is applied to the reinforcing strip. The strip is brought together with the basic housewrap fabric of this invention in a nip to insure good adhesion at the bond. Both pressure sensitive and non-pressure sensitive hot melt adhesives have proven useful in this process.

A number of approaches for getting the adhesive on the reinforcing strip can be considered, including extruding beads to yield thin lines of adhesive, slot die to apply a film of adhesive, spray at either high or reduced air pressure, wheel, and application of a non-pressure sensitive hot melt followed by cooling, wind-up, and then reactivation in a hot nip with the basic housewrap fabric. Spray application of high viscosity pressure sensitive hot melt adhesives have been particularly useful for adhering both spunbonded polypropylene and spunbonded Nylon 6,6 reinforcing strips to the basic housewrap fabric of this invention.

Although separate fabric strips are ordinarily used for reinforcement, it is also possible to create edge reinforcement by starting with a textile fiber web that is slightly wider than the meltblown web. After they are calendered together, the overhanging textile fiber web is folded over the exposed surface of the meltblown web and adhered to it as described.

Production Examples

In the production examples that follow, the calender nip was composed of a smooth steel roll and a resilient roll. The smooth steel roll could be heated to the desired processing temperature by circulating hot oil from an external heating source through the roll. The resilient roll consisted of a steel roll with a flexible covering as specified in each example. This roll was heated on its surface using banks of infrared lights. Roll temperature was controlled by varying the current applied to these lights. A hydraulic system forced the two rolls together to give the desired pounds of pressure per linear inch across the nip. The diameter of each roll was approximately 15 inches.

Table 1 gives roll temperatures, nip pressures, and lamination rates for each example.

Production Example 1

A fabric of this invention was made by laminating a polypropylene spunbonded fiber web to a polypropylene meltblown web. The spunbonded polypropylene web, James River's CELESTRA, has a basis weight of approximately 0.75 ounces per square yard and an average fiber denier of approximately 3.5. The filaments in this web were bonded together by exposure to a hot patterned roll under pressure in a calender such that approximately 18% of the fabric area consisted of diamond-shaped bond sites. The meltblown polypropylene web, James River's POLYWEB, had a basis weight of approximately 40 grams per square meter.

The two webs were calendered together using a processing line equipped with two unwind stands, a horizontal calender equipped with two rolls, and a turret winder. The speed of the webs through the processing line could be controlled. The webs were introduced in a vertical path into the calender nip.

In this example the resilient roll covering was a cured natural rubber formulated to yield a surface hardness of 95 shore A.

The two webs were indroduced into the calender nip such that the first spunbonded web contacted the smooth steel roll and the meltblown web contacted the resilient roll.

Production Example 2

A fabric of this invention was made by the procedure described in Production Example 1. However, the spunbonded polypropylene web was a 0.75 oz/yd² CELESTRA that had an average fiber denier of approximately 2 and in which approximately 6% of the fabric area consisted of diamond-shaped bond sites. The meltblown web used is sold by James River Corporation as POLYWEB polypropylene meltblown fabric grade 1098 with basis weight of approximately 20 grams per square meter.

Production Example 3

A fabric of this invention was made by the procedure described in Production Example 1. However, the meltblown polypropylene web was a POLYWEB that had a basis weight of approximately 20 grams per square meter. In this example the resilient roll covering was a chlorosulfonated polyethylene polymer cured to yield a surface hardness of 5 P and J.

Production Example 4

A fabric of this invention was made as in Production Example 3. However, different roll temperatures and nip pressure were used.

Production Example 5

A fabric of this invention was made by the procedure described in Production Example 3. However, the meltblown polypropylene web was a POLYWEB that had a basis weight o approximately 40 grams per square meter.

Production Example 6

A fabric of this invention was made by the procedure described in Production Examples 3. However, the spunbonded polypropylene web was a 0.75 oz/yd² CELESTRA that had an average fiber denier of approximately 2 and in which approximately 6% of the fabric area consisted of diamond-shaped bond sites.

Production Example 7

A Fabric of this invention was made as in Production Example 3. However, differing roll temperatures, nip pressure, and lamination rate were used.

Production Example 8

A fabric of this invention was made by laminating a polypropylene spunbonded fiber web to a polypropylene meltblown web. A strip of a second polypropylene spunbonded web was laminated in the machine direction of this fabric to provide reinforcement.

The first spunbonded web used is sold by James River Corporation as CELESTRA nonwoven fabric with basis weight of approximately 0.75 oz square yard and average fiber denier of approximately 3.5. The filaments in this web were bonded together by exposure to a hot patterned roll under pressure in a calender such that approximately 18% of the fabric area consisted of diamond-shaped bond sites.

The meltblown web used is sold by James River Corporation as POLYWEB polypropylene meltblown fabric grade 1098 with basis weight of approximately 20 grams per square meter.

The second spunbonded web, used as a reinforcement strip, is sold by James River Corporation as CELESTRA nonwoven fabric, with basis weight of approximately 1.25 oz per square yard and average fiber denier of approximately 3.5. The filaments in this web were bonded together by exposure to a hot patterned roll under pressure in a calender such that approximately 18% of the fabric area consisted of diamond-shaped bond sites. This fabric was cut into three-inch-wide strips for use as reinforcement. The reinforcement strip was laid on the opposite side of the meltblown web from the first spunbonded web during the calendering process.

The three webs were calendered together using a processing line equipped with tree unwind stands, a horizontal calender equipped with two rolls, and a turret winder. The speed of the webs through the processing line could be controlled. The webs were introduced in a vertical path into the calender nip.

The rolls in the calender included a smooth steel roll and a resilient roll. The smooth steel roll could be heated to the desired processing temperature by circulating hot oil from an external heating source through the roll. The resilient roll consisted of a steel roll with a covering of butadiene acrylonitrile copolymer. This roll was heated on its surface using banks of infrared lights. Temperature could be controlled by varying the current applied to these lights. A hydraulic system forced these two rolls together to give the desired pounds of pressure per linear inch across the nip. Diameter of each roll was approximately 15 inches.

The three webs were introduced into the calender nip such that the first spunbonded web contacted the smooth steel roll and the meltblown web contacted the resilient roll except for the area where the reinforcement strip separated the meltblown web from the resilient roll.

Production Example 9

A fabric of this invention was made by the procedure described in Production Example 8. However, the first spunbonded polypropylene web was a 0.75 oz/yd² CELESTRA that had an average fiber denier of approximately 2 and in which approximately 6% of the fabric area consisted of diamond-shaped bond sites.

Production Example 10

A fabric of this invention was made by the procedure described in Production Example 8. However, the meltblown polypropylene web was a POLYWEB that had a basis weight of approximately 40 grams per square meter.

Production Example 11

A fabric of this invention was made by the procedure described in Production Example 8. However, the spunbonded polypropylene web was replaced by a carded thermobonded polypropylene web having a basis weight of 20.6 grams per square yard.

Production Example 12

A fabric of this invention was made by a procedure substantially the same as that described in Production Example 8. However, three reinforcement strips with width of 2.5 inches were used and the webs were laminated by introduction into a horizontal nip formed by rolls of approximately 18 inch diameter.

TABLE I

LAMINATION PROCESS

| Production Example | Roll Temperature* Steel Roll | Roll Temperature* Resilient Roll | Nip Pressure (lbs/in) | Lamination Rate (ft/min) |
|---|---|---|---|---|
| 1 | 267 | 288 | 600 | 225 |
| 2 | 276 | 271 | 600 | 225 |
| 3 | 291 | 271 | 800 | 150 |
| 4 | 274 | 269 | 400 | 150 |
| 5 | 287 | 269 | 800 | 225 |
| 6 | 274 | 269 | 800 | 225 |
| 7 | 265 | 280 | 600 | 90 |
| 8 | 271 | 259 | 200 | 150 |
| 9 | 267 | 261 | 800 | 225 |
| 10 | 290 | 261 | 800 | 225 |
| 11 | 290 | 259 | 600 | 225 |
| 12 | 273 | 300 | 700 | 140 |

*Roll surface temperature in °F. measured by thermocomple from section of roll that contacts fabric in the course of roll rotation

Comparative Production Example

A fabric not of this invention was made by a procedure substantially the same as that described in Production Example 3. However, in this case, the "resilient" roll was coated with a very thin layer of Dupont's TEFLON brand plastic and was internally heated. The TEFLON plastic was too thin and hard to give resiliency to the roll. Several samples were made at 265–280° F. temperature using the two rolls and a pressure of 150 pounds per linear inch. Each sample showed alternating regions of clear transparent film and opaque regions where little or no bonding between the spunbonded and meltblown webs could be seen. No areas of strong, controlled porosity fabric useful as a housewrap could be observed.

Production Example 13

A reinforced housewrap fabric of this invention was prepared from the fabric of Production Example 7. A three-inch wide strip of CELESTRA spunbonded polypropylene fabric having a basis weight of approximately 1.25 oz/yd$^2$, fiber denier averaging approximately 3.5, and with approximately 18% of the fabric area consisting of diamond-shaped bond sites was used as the reinforcement. A pressure sensitive hot melt resin was charged into a hot melt application system, heated to approximately 400° F., and then extruded as a series of 8 very narrow lines of adhesive on the reinforcing strip web. The reinforcing strip was united with the fabric of Production Example 7 in a nip.

Production Example 14

A reinforced housewrap fabric of this invention was prepared by the procedure described in Production Example 14. However, the hot melt adhesive was forced out of a two-inch wide slot die to yield a thin film of adhesive (rather than thin lines of adhesive) on the reinforcing strip web.

Production Example 15

A reinforced housewrap of this invention as illustrated in FIG. 1 was prepared starting with the basic laminate without reinforcing strips made as described in Production Example 12. Strips of CELESTA spunbonded polypropylene fabric, 2.5 inches in width, having a basis weight of approximately 1.25 oz/yd$^2$, fiber denier averaging approximately 3.5, and with approximately 18% of the fabric area consisting of diamond-shaped bond sites was used as the reinforcement. A pressure sensitive hot melt resin was charged into a hot melt application system, heated to approximately 370° F., and then sprayed using a stream of hot air onto the reinforcing strips. The three reinforcing strips, disposed along the outside edges and in the center, were united with the basic laminate in a nip.

Production Example 16

An improved fabric of this invention was made in which the reinforcing web acted as both reinforcement and as a seaming tape to hold two base fabrics of this invention together thus yielding a final nine-foot-wide reinforced housewrap product. Preparation was as follows.

Two base fabrics were prepared by a procedure similiar to that described in Production Example 12. However, one base fabric was made with reinforcement strips along one outside edge and in the center of the laminate. The second base fabric was made with reinforcement strips along the opposite edge and in the center of the laminates. The two base fabric were edge-trimmed and then overlapped approximately ⅛ inch.

A three inch wide CELESTA fabric, described in Production Example 15, was sprayed with hot melt adhesive. The reinforcement strip was united with the two overlapped base fabrics such that the two fabrics were seamed together and a reinforcement strip resulted down the middle of a nine-foot-wide housewrap fabric.

Properties Examples

The fabric of this invention results when the textile fiber web and the meltblown web are calendered together using heat and pressure to yield a strong controlled-porosity material useful as housewrap. To be useful, the fabric must possess sufficient strength to be handled at the construction site and be fastened to the sheathing of the house.

Controlled porosity insures that air flow through the wall of the house is reduced but not totally eliminated. Reduced air flow through the wall would reduce the rate of air change in the house, keep outside air out of the wall insulation, and reduce drafts. However, since air flow is only reduced, not eliminated, water vapor will be transmitted, thus preventing condensation in the walls. Fabrics of this invention have average strengths as measured by the Elmendorf Tear Method D 1424-83 ASTM in the cross web direction of at least about 100 g. The air porosity of fabrics of this invention have Gurley Porosity as measured by the Gurley Porosity Method; ASTM-D-726-58 Method A, 20 oz cylinder, 0.25 sq. inch sample; between about 1.0 seconds and about 60 seconds. In this test a low value denotes a greater flow of air through the fabric, and a high value denotes a very low flow of air through the fabric.

In the Tables that follow, "MD" represents "Machine Direction" and "XD" represents "Cross Machine Direction".

TABLE II

UNREINFORCED FABRICS

| Properties Example | Tensile Strength (lbs)[1] MD | Tensile Strength (lbs)[1] XD | Elmendorf Tear (gms)[2] MD | Elmendorf Tear (gms)[2] XD | Gurley Porosity (secs.)[3] 5 oz Cyl | Gurley Porosity (secs.)[3] 20 oz Cyl |
|---|---|---|---|---|---|---|
| 1 | 8.3 | 4.1 | 225 | 302 | 232 | 10[4] |

TABLE II-continued

UNREINFORCED FABRICS

| Properties | Tensile Strength (lbs)[1] | | Elmendorf Tear (gms)[2] | | Gurley Porosity (secs.)[3] | |
|---|---|---|---|---|---|---|
| Example | MD | XD | MD | XD | 5 oz Cyl | 20 oz Cyl |
| 2 | 9.3 | 3.0 | 301 | 478 | 199 | 10[4] |
| 3 | 8.9 | 3.3 | 144 | 214 | 336 | 24 |
| 4 | 7.4 | 3.1 | 222 | 290 | 78 | 5 |
| 5 | 8.4 | 3.2 | 318 | 497 | 190 | 13 |
| 6 | 9.2 | 3.2 | 299 | 378 | 203 | 13 |
| 7 | 7.7 | 3.3 | 154 | 237 | 211 | 16 |
| TYVEK | 27.2 | 34.3 | 326 | 298 | — | 8 |

[1] Tensile strength was determined by generally following ASTM-D-1682 One-Inch Cut Strip Method, but with 5 inch gauge length, and cross-head speed 5 inches per minute.
[2] Elmendorf Tear was determined following ASTM-D-1424 Tear Resistance of Woven Fabrics by Falling Pendulum (Elmendorf) Apparatus.
[3] Gurley Porosity was determined following ASTM-D-726-58 Method A using a 5 oz or 20 oz cylinder.
[4] Estimated value based on value observed when 5.0 oz. cylinder was used.

TABLE III

REINFORCED FABRICS[1]

| Properties | Tensile Strength (lbs)[2] | | Elmendorf Tear (gms)[3] | | Gurley Porosity (secs.)[4] | |
|---|---|---|---|---|---|---|
| Example | MD | XD | MD | XD | 5 oz Cyl | 20 oz Cyl |
| 8 | 18.8 | | 1950 | | 40 | 3[5] |
| 9 | 16.8 | | 1434 | | 119 | 10[5] |
| 10 | 16.4 | | 1220 | | 280 | 20[5] |
| 11 | 15.8 | | 1148 | | 316 | 20[5] |
| 12 | 15.71[6] | | 844 | | — | 15 |

[1] Tested at reinforced strips.
[2] Tensile strength was determined by generally following ASTM-D-1682 One-Inch Cut Strip Method but with 5 inch gauge length, and cross head speed 5 inches per minute.
[3] Elmendorf Tear was determined following ASTM-D 1424 Tear Resistance of Woven Fabrics by Falling Pendulum (Elmendorf) Apparatus.
[4] Gurley Porosity was determined following ASTM D-726-58 Method A using a 5 oz or 20 oz cylinder.
[5] Estimated value based on value observed when 5.0 oz. cylinder was used.
[6] Tensile strength was determined by generally following ASTM-D-1682 One-Inch Cut Strip Method, but with 8 inch gauge length, and cross-head speed of 2 inches per minute.

Properties Example 13

A sample fabric made in Production Example 16 was demonstrated to have sufficient strength to be installed as a housewrap. The fabric sample, 9 feet wide and 16 feet long, was stapled to a framework made with studs 16 inches apart at the center with a double plate nine feet above the base. This frame work was attached to the south exterior side of a building. The fabric was fastened on each stud with staples 6 inches apart. The left and right ends of the housewrap sample were fastened with staples 4 inches apart. The reinforcing strip along the top edge of the sample was tacked into the wall plate. Both reinforcing strips and the base fabric itself were used as fastening sites for the staples into the studs. The fabric on the framework was examined after one month of outdoor, south exposure. Minimum damage was observed.

The present disclosure is intended to be illustrative rather than restrictive. The scope of the invention is limited only by the language of the following claims.

We claim:

1. A translucent nonwoven fabric composite suitable for use as a housewrap comprising a meltblown web of generally discontinuous microfibers formed from a first thermoplastic polymer and having a basis weight in the range of from about 0.5 through about 2.0 oz/yd$^2$, to which is bonded a textile fiber web composed primarily of randomly-deposited molecularly-oriented filaments of common textile denier spun from a second, compatible, thermoplastic polymer and having a basis weight in the range of from about 0.5 through 1.25 oz/yd$^2$.

2. A fabric composite according to claim 1 wherein said first thermoplastic polymer and said second thermoplastic polymer are selected from the pairs consisting of, respectively: Nylon 6 with Nylon 6; Nylon 6 with Nylon 6,6; poly(ethylene terephthalate) with poly(ethylene terephthalate) and/or poly(ethylene isophthalate) or copolymers thereof; poly(butylene terephthalate) with poly(ethylene terephthalate and/or poly(ethylene isophthalate) or copolymers thereof; polypropylene with polypropylene; and polyethylene with polyethylene.

3. A fabric composite according to claim 2 comprising a spunbonded polypropylene fabric layer, a meltblown polypropylene fabric layer bonded to said spunbonded polypropylene fabric layer, and a plurality of reinforcing fabric strip spaced apart and bonded to said meltblown fabric layer.

4. The fabric composite of claim 3 wherein each of the reinforcement strips has a basis weight in the range of from about 0.75 through about 1.5 oz/yd$^2$.

5. The fabric composite of claim 4 wherein said strips are bonded to said meltblown fabric layer in such a manner that one lies on top of each edge of said layer and the remainder are disposed approximately equidistantly from each other and from the edge strips.

6. A fabric composite as in claim 5 wherein said reinforcing strips are bonded to said meltblown layer with adhesives or by direct lamination.

7. The fabric composite of claim 6 wherein the reinforcing fabric strips are composed of spunbonded polypropylene.

8. The fabric composite of claim 7 wherein said strips are from about 0.75 through about 3.0 inches wide and are separated from one another by from about 14 inches through about 48 inches.

9. The fabric composite of claim 8 wherein three strips are bonded to a meltblown/spunbonded laminate that is from about 30 through about 90 inches wide.

10. The fabric composite as in claim 8 wherein five strips are bonded to a meltblown/spunbonded laminate that is from about 70 through about 150 inches wide.

11. A fabric composite as in claim 3 wherein at least one of said spunbonded fabric layer and said meltblown layer has been rendered resistant to ultraviolet light radiation.

12. A translucent fabric composite of claim 1 which has been prepared by calendering said textile fiber web and said meltblown web together in a nip equipped with a resilient roll.

13. A fabric as in claim 12 wherein said resilient roll was externally heated.

* * * * *